US011350290B2

(12) United States Patent
Singh et al.

(10) Patent No.: US 11,350,290 B2
(45) Date of Patent: May 31, 2022

(54) DOWNLINK INTERFERENCE DETECTION AND IDENTIFICATION OF AGGRESSOR CELLS

(71) Applicant: VMWARE, INC., Palo Alto, CA (US)

(72) Inventors: Sarabjot Singh, Palo Alto, CA (US); Srikanth Hariharan, Sunnyvale, CA (US); Manu Sharma, Palo Alto, CA (US); Adnan Raja, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 171 days.

(21) Appl. No.: 16/718,636

(22) Filed: Dec. 18, 2019

(65) Prior Publication Data

US 2020/0195359 A1 Jun. 18, 2020
US 2022/0131626 A9 Apr. 28, 2022

Related U.S. Application Data

(60) Provisional application No. 62/854,058, filed on May 29, 2019, provisional application No. 62/781,349, filed on Dec. 18, 2018.

(51) Int. Cl.
*G06N 20/00* (2019.01)
*H04B 17/336* (2015.01)
(Continued)

(52) U.S. Cl.
CPC ............ *H04W 16/22* (2013.01); *G06N 20/00* (2019.01); *H04B 17/336* (2015.01); *H04B 17/373* (2015.01); *H04B 17/3913* (2015.01); *H04L 1/0026* (2013.01); *H04L 1/0032* (2013.01); *H04L 1/20* (2013.01); *H04L 5/0055* (2013.01); *H04L 5/0057* (2013.01); *H04L 5/0073* (2013.01); *H04L 41/0631* (2013.01); *H04L 41/145* (2013.01); *H04L 41/147* (2013.01); *H04L 41/22* (2013.01); *H04L 43/045* (2013.01); *H04L 43/0888* (2013.01);
(Continued)

(58) Field of Classification Search
CPC ....... G06N 3/02–105; G06N 20/00–20; H04B 17/0082–3913; H04L 1/0023–0032; H04L 1/20–208; H04L 5/0053–0089; H04L 41/02–32; H04L 43/02–50; H04W 16/02–225; H04W 24/02–10; H04W 84/005–22; H04W 88/005–188; H04W 92/02–24

See application file for complete search history.

(56) References Cited

U.S. PATENT DOCUMENTS

2011/0243084 A1* 10/2011 Buddhikot ............ H04W 16/12
2014/0112164 A1* 4/2014 Wigren ................. H04W 24/08

\* cited by examiner

*Primary Examiner* — Timothy J Weidner
(74) *Attorney, Agent, or Firm* — Clayton, McKay & Bailey, PC (57) ABSTRACT

A system can include a network analysis platform that applies models to identify downlink interference at a network cell, such as at a base station. For a session at a cell, an expected performance with normalized downlink interference can be compared to an actual performance to determine whether the session is impacted. This can include normalizing channel quality index ("CQI") and negative-acknowledgement ("NACK") rate. Overshooting aggressor cells can be identified as the source of the downlink interference based on a useless overlap fraction exceeding a threshold. The impacted sessions and root causes can be displayed on a graphical user interface ("GUI").

20 Claims, 9 Drawing Sheets

(51) Int. Cl.
*H04B 17/373* (2015.01)
*H04B 17/391* (2015.01)
*H04L 1/00* (2006.01)
*H04L 1/20* (2006.01)
*H04L 5/00* (2006.01)
*H04L 41/0631* (2022.01)
*H04L 41/14* (2022.01)
*H04L 41/147* (2022.01)
*H04L 41/22* (2022.01)
*H04L 43/045* (2022.01)
*H04L 43/0888* (2022.01)
*H04L 43/16* (2022.01)
*H04L 43/50* (2022.01)
*H04W 16/22* (2009.01)
*H04W 24/02* (2009.01)
*H04W 24/06* (2009.01)
*H04W 24/08* (2009.01)
*H04W 24/10* (2009.01)
*H04W 88/18* (2009.01)
*H04W 92/02* (2009.01)

(52) U.S. Cl.
CPC .............. *H04L 43/16* (2013.01); *H04L 43/50* (2013.01); *H04W 24/02* (2013.01); *H04W 24/06* (2013.01); *H04W 24/08* (2013.01); *H04W 24/10* (2013.01); *H04W 88/18* (2013.01); *H04W 92/02* (2013.01)

DOWNLINK INTERFERENCE DETECTION AND IDENTIFICATION OF AGGRESSOR CELLS

CROSS-REFERENCE TO RELATED APPLICATIONS

This non-provisional application claims priority to provisional application No. 62/781,349, titled "Downlink Interference Detection and Identification of Aggressor Cell," filed Dec. 18, 2018, and also claims priority to provisional application No. 62/854,058, titled "Systems and Methods for Service Aware Uplink Quality Degradation Detection," filed May 29, 2019, both of which are incorporated by reference in their entireties.

BACKGROUND

In a wireless telco network, such as a modern Long-Term Evolution ("LTE") network, downlink communications are sent to user devices from a base station. Interference in the downlink is one of the leading causes of degraded quality of service ("QoS") for users within the network. Downlink interference can affect downlink throughput, voice quality, accessibility, and retainability, for example. As cellular networks continue to densify in an attempt to extract performance from all allocated bandwidths, downlink interference can become even more pervasive and problematic.

Downlink interference can be challenging to fix, as it can have multiple causes. For example, it can be caused not only by the configuration and state of the serving base station in communication with a user device, but also by the configurations and states of neighboring base stations that can interfere with the serving base station. For example, a neighboring base station may be transmitting at a power level that is too high, causing the signal to excessively overlap with the serving base station's signal. Similarly, a neighboring base station may be configured with an electronic tilt angle that expands the coverage area to overlap with the serving base station's signal. In either case, a user device receiving data from the serving base station can experience downlink interference and resulting QoS issues due to the overlapping aggressor cell.

As a result, a need exists for detecting downlink interference affecting a user device in a wireless cell network. A need further exists for identifying an aggressor base station that is causing the downlink interference.

SUMMARY

Examples described herein include systems and methods for detecting downlink interference and aggressor cells in a telco network. A network analysis platform can use a trained performance model to compare actual performance of a user session to a normalized performance to determine if downlink interference exists. The performance model can be trained based on historical telemetry data. The telemetry data can include performance-related information for cells in the network. Example cells can include base stations, cell towers, or any node within the network. The telemetry data can be session-specific, related to cellular connections in the network. For example, the telemetry data can relate to signal quality, cell load, and interference level.

To determine actual performance of a session, the network analysis platform can supply telemetric data as inputs to the performance model. These inputs can include channel quality index ("CQI") and uplink negative acknowledgment ("NACK") rate. The output can be an actual throughput value. (Downlink throughput is referred to as throughput for convenience.) The network analysis platform can also predict an expected performance using the performance model. This can include normalizing downlink interference factors and supplying those normalized factors as inputs to the network analysis platform, while keeping path loss unchanged. In one example, downlink interference is normalized by setting a value based on downlink interference across like-type cells in the network. For example, a normalized CQI can be a value representing the 25th percentile of CQI across the network for the same path loss of the session. A normalized NACK rate can be the 75th percentile of NACK rate for cells having the normalized CQI. In another example, the normalized downlink interference is determined based on at least one of: an average CQI over the network, a NACK rate across the plurality of cells, and a ratio of Rank 2 transmissions for the network. These normalized values can be input into the performance model and the output (e.g., expected throughput) can represent an expected performance.

The network analysis platform can then determine that the session is impacted by downlink interference based on the expected throughput exceeding the actual throughput by at least a threshold amount. In response, the network analysis platform can indicate to a graphical user interface ("GUI") that downlink interference exists with respect to the first cell.

In one example, the network analysis platform also determines one or more overshooting aggressor cells. These cells can cause downlink interference by over transmitting due to misconfigured transmit power or electronic tilt parameters. To perform this root cause analysis ("RCA"), the network analysis platform can examine overlapping reception for sessions from other cells. In one example, the network analysis platform can identify a second cell as responsible for the downlink interference by determining that the second cell has a useless overlap fraction that exceeds an overlap threshold. The GUI can then indicate that power configuration and an electronic tilt configuration should be adjusted at the second cell.

The useless overlap fraction can be a measure of sessions in first cell receiving strong signals from both the first and second cells. The strong signals can be defined as having a Reference Signal Receive Power ("RSRP") above a power threshold. In one example, the useless overlap fraction can be defined as the 75th percentile of useless overlap fractions among the plurality of cells.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

The system can include a network analysis platform that applies one or more pre-trained performance models to determine if downlink interference is impacting sessions at a cell. The performance models are trained based on network telemetry data that is collected by the network analysis platform. For a session at a cell, an expected performance value can be compared to an actual performance value to determine whether the session is impacted by downlink interference. The performance value can be downlink throughput, in an example.

The expected performance value can be determined by applying normalized factors representing a normalized downlink interference to the performance model. The normalized downlink interference can be based on the path loss of the session and at least one factor relative to the other like-type cells in the network. For example, a normalized CQI can be a value representing the 25th percentile of CQI across the network for the same path loss of the session. A normalized NACK rate can be the 75th percentile of NACK rate for cells having the normalized CQI. In another example, the normalized downlink interference is determined based on at least one of: an average CQI over the network, a NACK rate across the plurality of cells, and a ratio of Rank 2 transmissions for the network. The actual performance value can also be determined with the same performance model, in an example. If the expected and actual performance values diverge beyond a threshold amount, this can indicate that the session is impacted by downlink interference.

The network analysis platform can also identify overshooting aggressor cells that are causing the downlink interference. To do this, the network analysis platform can determine that a second cell has a useless overlap fraction that exceeds an overlap threshold. The second cell can then be classified as an aggressor cell.

A GUI can display the cells and number of corresponding impacted sessions. The GUI can also display the root cause, such as by identifying the aggressor cells. The GUI can also indicate that power configuration and an electronic tilt configuration should be adjusted at the aggressor cell.

Figure 1:
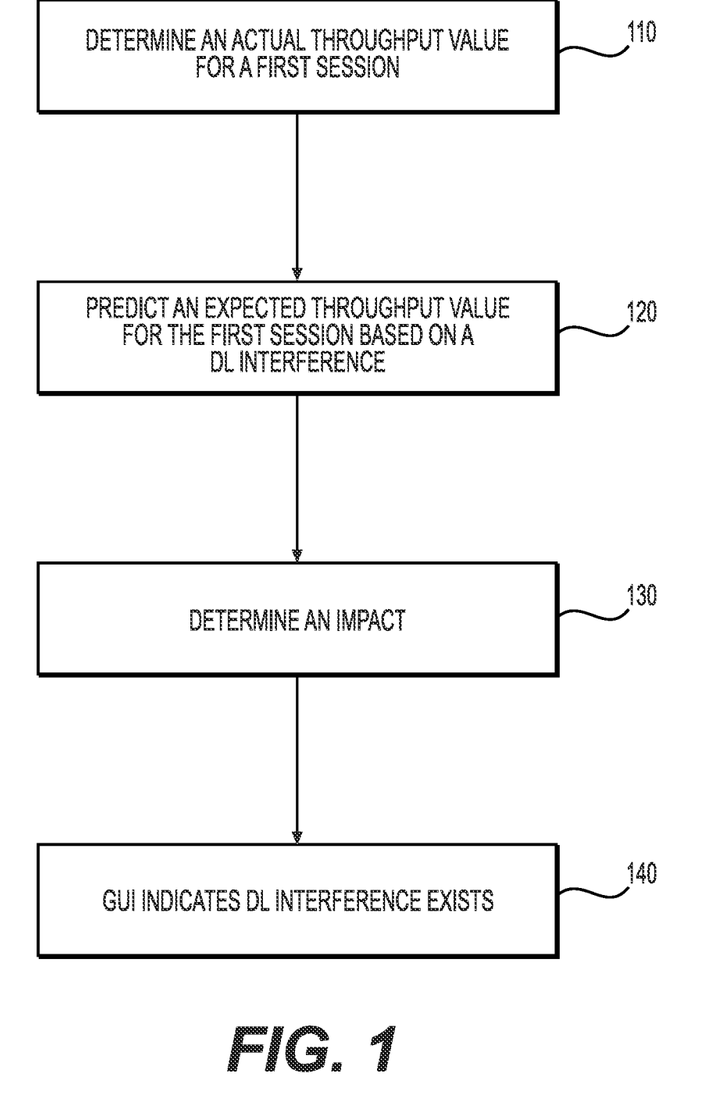
FIG. 1 is a flowchart of an example method for downlink interference detection and aggressor cell detection.

FIG. 1 is a flowchart of an example method for downlink interference detection and identification of aggressor cells. The detection can be based on comparing actual and expected performance based on a performance model. The inputs can include current and normalized downlink interference for a session at a cell.

At stage 110, the network analysis platform can determine an actual performance value, such as a throughput value, for a session at a cell. A performance model can receive session telemetry data as input, an output the actual throughput. The actual throughput can represent a current performance state of the session at the cell. The telemetry data used as input can include CQI, path loss, a ratio of Rank 2 transmissions, NACK rate, and user experience per active transmission time interval ("TTI"), among others. Although throughput is used as an example, other outputs are possible for the performance value.

The performance model can be pre-trained to output throughput based on other factors. The performance model can be a neural network, in an example. The training can include applying machine learning algorithms to a large set of telemetry data to tune a performance model for predicting throughput.

At stage 120, the network analysis platform can predict an expected throughput for the first session based on normalized downlink interference. This can include normalizing one or more features that pertain to downlink interference based on values derived from those same features at other cells in the network. For example, a normalized CQI can be a value representing the 25th percentile of CQI across the network for the same path loss of the session. A normalized NACK rate can be the 75th percentile of NACK rate for cells having the normalized CQI. In another example, the normalized downlink interference is determined based on at least one of: an average CQI over the network, a NACK rate across the plurality of cells, and a ratio of Rank 2 transmissions for the network.

One or more of these normalized features can be used as inputs, along with features that are not normalized, such as path loss of the session. Using these inputs, the performance model can output an estimated downlink throughput value in an example. The normalized factors can be selected to estimate what the cell's throughput would be at a cell with the same path loss that is not suffering from downlink interference.

Table 1 includes example normalized features that can be used with the performance model to estimate a downlink interference state of the cell.

TABLE 1

Example normalized features use with performance model.

| Normalized Feature | Description |
| --- | --- |
| $CQI_{New}$ | $25^{th}$ percentile of CQI over the network for like-type cells with the path loss of the session. |
| NACK rate$_{New}$ | $75^{th}$ percentile of NACK rate corresponding to the $CQI_{New}$ over the network. |
| CQI2 (normalized) | CQI2 + $CQI_{New}$ minus the session's average CQI if CQI2 is greater than 0, otherwise 0. |

As shown above, the new (normalized) CQI can be determined as the $25^{th}$ percentile of CQI over the network for like-type cells with the path loss of the session. This value can be looked up in a table where the network analysis platform maintains values for $25^{th}$ percentile CQI relative to different path loss values. Cells can transmit at higher and lower power, be macro or micro, and the cells used to determine the new CQI can be of similar cell type to the serving cell.

The normalized NACK rate can be based on NACK rates measured from telemetry data. It can be set at a value representing the $75^{th}$ percentile of cells for the normalized CQI. CQI2 is a ratio for a RANK2 transmission. A cell often can transmit in multiple modes. CQI2 can indicate the ratio of transmissions between the two modes. The new CQI2 can be boosted based on a higher average CQI. One or more of these three features can represent normalized downlink interference and be used as inputs to the performance model. The performance model can then output an expected throughput value. Although throughput is used as an example, the model could alternatively output a different performance value.

At stage 130, the network analysis platform can classify the first session as impacted by downlink interference based on the expected performance value differing from the actual performance value by at least a threshold amount. For example, if throughput differs by 10% or 20%, the network analysis platform can determine the session is impacted by downlink interference.

At stage 140, the GUI can indicate the downlink interference exists at the cell. In one example, the GUI represents cells in the network on a map relative to their geographic locations. A first base station can be highlighted on the map when a threshold number of session impacts are detected for the first base station. For example, the network analysis platform can count each session that is impacted in stage 130 and display the number of impacted sessions, in an example. If the number of impacted sessions exceeds a threshold, then the GUI can draw the administrator's attention based on additional highlighting of the base station icon or number of impacted sessions.

The GUI can also provide information about the impacted sessions. As will be described, the network analysis platform can determine aggressor cells based on overlapping transmissions with the cell that has impacted sessions. The aggressor cells can be identified, including information on how to address the downlink interference based on changes to the aggressor cells.

Figure 2A:
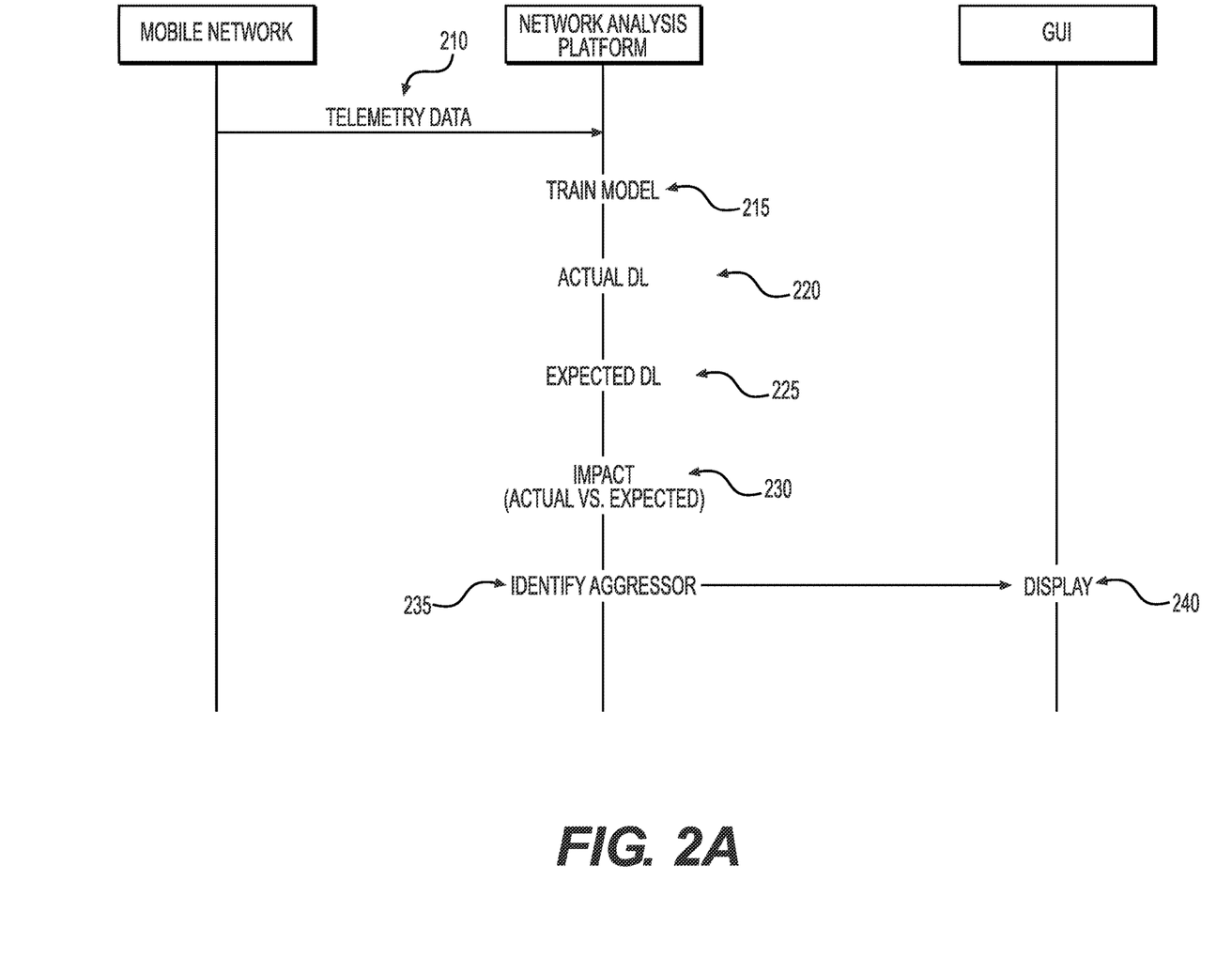
FIG. 2A is a sequence diagram of an example method for downlink interference detection and aggressor cell detection.

FIG. 2A is a sequence diagram of an example method for detecting downlink interference and identifying aggressor cells. At stage 210, telemetry data can be received at the network analysis platform from various cells within the mobile network. Stage 210 can be ongoing in an example, with telemetry data being received at periodic intervals or constantly queued from reporting cells. The telemetry data can be captured and measured in real time by base stations, which send the telemetry data to the network analysis platform.

Based on past telemetry data, at stage 215 the network analysis platform or some other process can train a performance model. Regression analysis and machine learning can be used to train the model. In one example, the inputs from Table 1 are used to train the model with respect to throughput, which can be measured at a cell. This can result in a model that acts as a neural network and outputs a performance value, such as throughput, based on telemetry inputs. Example inputs can include CQI, path loss, a ratio of Rank 2 transmissions, NACK rate, and user experience per active TTI, among others.

At stage 220, an actual performance value can be determined using the session's actual factors related to downlink throughput, such as path loss, CQI, NACK rate, and CQI2. These can be non-normalized and supplied as inputs to the performance model. The performance model can output the actual performance value, which can be a throughput value.

At stage 225, the network analysis platform can predict the expected performance value by using normalized downlink interference. This can include normalizing one or more of CQI, NACK rate, and CQI2. However, in one example, path loss is not normalized but instead is maintained. Instead, the path loss can be used to properly normalize one or more of CQI, NACK rate, and CQI2. The normalized downlink throughput values can be used as inputs to the performance model to return an expected performance value, which can be a throughput value.

At stage 230, the network analysis platform can compare the actual and expected performance values to determine whether a session is impacted by downlink interference. If the two values differ by more than a threshold, such as 10%, then the network analysis platform can determine an impact exists.

When a session is impacted by downlink interference, at stage 235 the network analysis platform can identify one or more responsible aggressor cells.

Figure 2B:
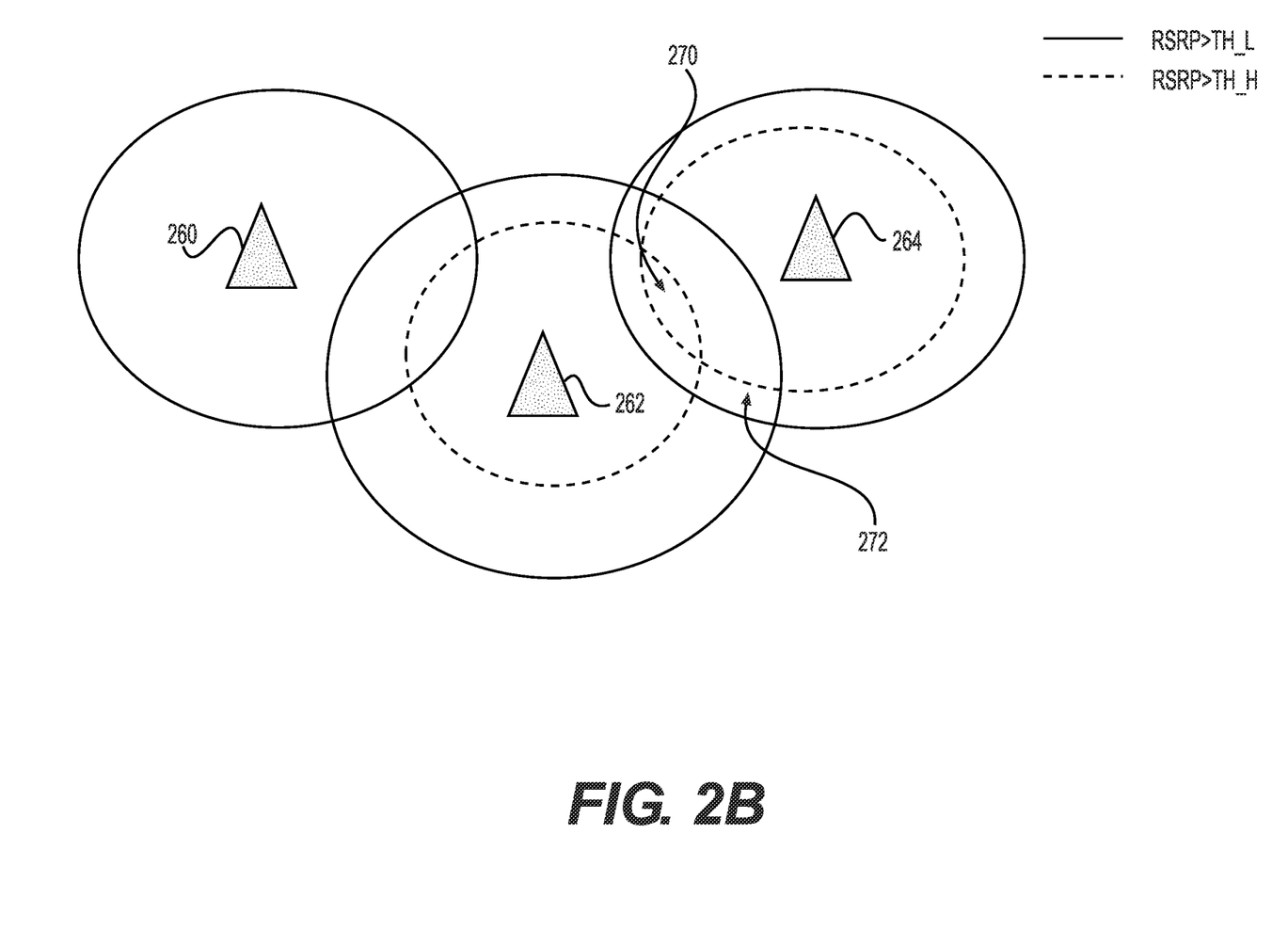
FIG. 2B is an example diagram of overlap between cells.

FIG. 2B is an example illustration of inter-cell overlap and overshooting. When a cell has been identified as impacted by downlink interference, the network analysis platform can determine which aggressor cells are responsible for the interference at the victim cell where the impact was detected. The network analysis platform can identify a second cell (i.e., aggressor cell) as responsible for the downlink interference based on over transmission. In one example, the network analysis platform can determine that the second cell has a useless overlap fraction that exceeds an overlap threshold. The useless overlap fraction can be a measure of sessions in the first cell (i.e., victim cell) receiving strong signals from both the first and second cells. Strong signals can be defined as signals having a Reference Signal Receive Power (RSRP) above a power threshold.

In FIG. 2B, cells 260, 262, 264 are shown with transmission rings around each cell. The solid line rings indicate an RSRP with a signal power that is above a low signal-power threshold. The dashed line rings indicate an RSRP with a signal power that is above a high signal-power threshold, which is higher than the low signal-power threshold. Transmission power levels can be implemented so that some overlap does exist, allowing cellular users to move geographically without losing reception between cells 260, 262, 264. But this overlap can be mostly limited to transmissions above the low signal-power threshold but below the high signal-power threshold. In one example the high signal-power threshold is −90 dB.

A first overlap region 272 can provide this seamless user experience without wastefully over-transmitting because RSRP from both cell 262 and cell 264 remains below the high signal-power threshold. Neither cell 262, 264 is overpowering the other in the first overlap region 272 of this example. But because both cells 262, 264 are transmitting above the low signal-power threshold, seamless transitions can occur for user sessions.

In contrast, useless overlap exists at a second overlap region 270. In this region 270, both cells 262 and 264 are transmitting with RSRP higher than the high signal-power threshold. This kind of high overlap can be detrimental to signal quality because it can increase interference between intermediate neighbor cells and interrupt flow in one-hop neighbors. In this example, both of the immediate neighbor cells 262, 264 are transmitting above the high signal-power threshold in region 270.

The network analysis platform can identify useless overlap when a useless overlap fraction exceeds a threshold. The fraction can be the ratio of sessions having neighboring cells both transmitting about the high-signal power threshold. In the example of FIG. 2B, the fraction of cell 264 with cell 262 is the fraction of sessions in cell 262 receiving strong signals (RSRP>th_h) from both cells 262, 264 over all sessions in cell 262 that register signal from cell 264. The useless overlap fraction can therefore be a fraction of sessions reporting high signal quality (RSRP>th_h) from multiple cells versus sessions reporting low signal quality (RSRP>th_l) from multiple cells. If this fraction exceeds a threshold, then the network analysis platform can classify cell 264 as an overshooting aggressor cell. In one example, the threshold for the overlap fraction is defined as the 75th percentile of useless overlap fractions among the like-type cells (e.g., base stations) in the network.

The aggressor cells can be compared against a session's radio resource control ("RRC") measurement reports prior to being identified as aggressor cells in the GUI. These RRC reports can identify the cells that are causing interference. The RRC reports can identify neighboring cells by ID, which can be matched against potential aggressor cells identified by the network analysis platform as causing the session interference.

The GUI can identify the aggressor cell and provide recommendations for reducing the interference, such as indicating that at least one of a power configuration and an electronic tilt configuration should be adjusted at the second cell.

Figure 3A:
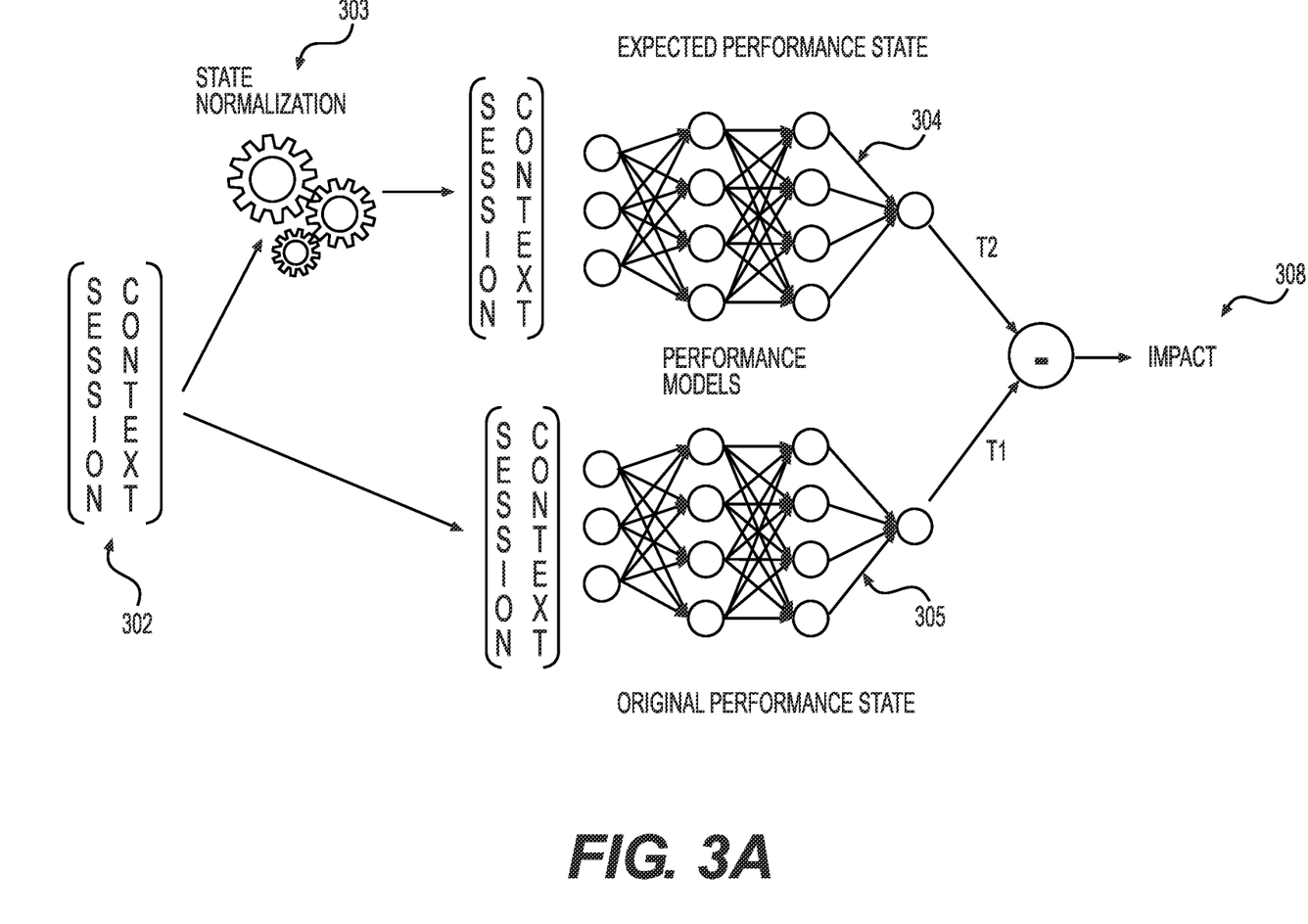
FIG. 3A is a flowchart of an example method for using performance models to determine sessions impacted by downlink interference.

FIG. 3A is a flowchart of an example method for using performance models to determine coverage degradation impact. The performance models 304, 305 can be used to determine an expected performance state and a current (original) performance state for a session at a cell, in an example. The process can start using session context 302, which can include various parameters regarding the session, such as signal quality, path loss, CQI, and NACK rate.

At stage 303, the network analysis platform can normalize downlink interference by setting certain feature values to a normalized level for determining expected performance. For example, as explained with respect to Table 1, a $75^{th}$ percentile NACK rate and $25^{th}$ percentile CQI at the session's path loss level can be used. These normalized feature values can be used as inputs, along with other telemetry data, in the performance model 304. The performance model 304 can output an expected throughput value T2. This value (T2) can be compared against an actual throughput at the cell during the session. The actual throughput can likewise be estimated by the performance model 305, which can be the same as performance model 304 in an example. The output of actual throughput can be T1. Alternatively, actual throughput T1 can be calculated in real time based on telemetry and without the need to estimate using the performance model 305. Although throughput is used an example, other performance value types are possible as outputs from the performance model 305.

The difference between T2 and T1 can indicate an impact 308, in an example. In one example, the difference between T2 and T1 must exceed a threshold before an impact 308 is indicated. The network analysis platform can track the number of impacted sessions at a cell for purposes of identifying victim cells and displaying impact numbers on the GUI.

Figure 3B:
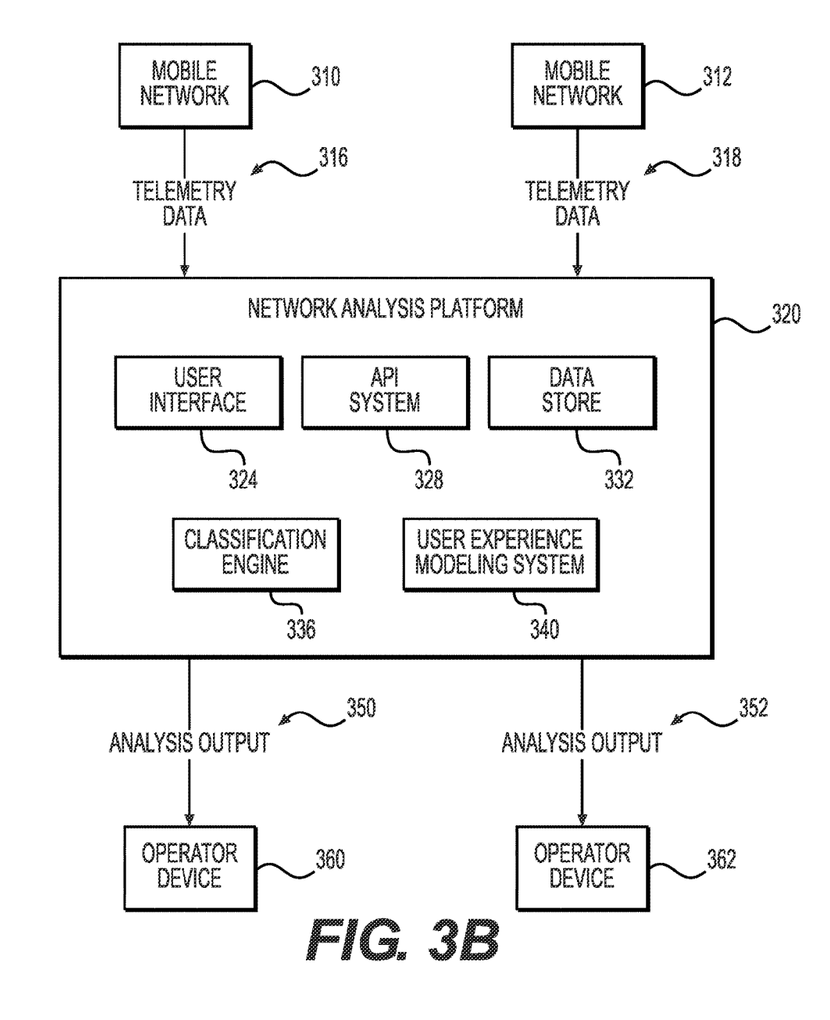
FIG. 3B is an illustration of example system components for downlink interference detection and aggressor cell identification.

FIG. 3B shows an illustration of an example system that includes a network analysis platform 320 and a network 310. The network 310 can be a wireless network that provides network communication for mobile devices. For example, the network 310 can be at least one of a mobile network, cellular network, wireless network, wireless spectrum network, or any other network maintained by a network operator. In some examples, the network operator is a streaming media provider, internet service provider, vendor, or other entity associated with a network.

The mobile network 310 can send telemetry data 316 to the network analysis platform 320. The network analysis platform 320 can also receive information from a separate, second mobile network 312 that provides its own telemetry data 318. The telemetry data 316, 318 can provide a time-frequency characteristic and a spatial characteristic. In some examples, telemetry data 316, 318 includes at least one of: a timestamp of when an event occurred in the network 310, 312; a threshold relating to data bandwidth, download speed, call failure, or other aspect of the network has been exceeded, and at what time; the frequency of calls being dropped for VoiceIP data; the location of cell towers within the mobile network; customer complaints received, in which areas, and at what frequency; and any other data relating to the network 310, 312 and telemetry 316, 318. The platform 320 can monitor the network 310, 312 and collect the associated telemetry data 316, 318. In some embodiments, the telemetry data 316, 318 is stored within a datastore 332 within the platform 320 or available to the platform 320.

The telemetry data 316, 318 can also include at least one of user network session throughput information for at least one user network session, and user network session radio access network ("RAN") information for at least one user network session. In some examples, RAN information includes information describing radio communication between a transceiver of an edge node of the network 310, 312 and a modem of a UE of the user network session. In some embodiments, RAN information for a user network session ("user session" or "session") includes at least one of: downlink coverage (RSRP, RSRQ) of the user session; downlink quality (SINR, CQI) experienced by the user session; uplink coverage (path loss, uplink power restriction) of the user session; uplink quality (PUSCH, PUCCH SINR) experienced by the user session; downlink modulation and coding for the user session; uplink modulation and coding for the user session; downlink PRB resources allocated for the user session; downlink PRB usage of cell; uplink PRB resources allocated for the user session; uplink PRB usage of cell; control channel utilization in cell; number of active users in cell on uplink and downlink; number of active users in cell perceived by user session; QCI of the user session; downlink NACK rate of the user session; downlink DTX rate of the user session; uplink NACK rate of the user session; uplink DTX rate of the user session; available bandwidth and control channel elements on uplink and downlink; and Power Headroom Reports (PHR) of the user session.

In some examples, the network 310, 312 includes at least one infrastructure element, such as, for example, a base station, a cell tower, and other elements of a mobile network infrastructure. The network 310, 312 can be a Long-Term Evolution ("LTE") network or a 5G network, for example. In some embodiments, the network 310, 312 includes at least one edge node. The edge node can include at least one of a radio transceiver, a power amplifier, and an antenna. In some examples, the edge node is constructed to exchange information with at least one user device (e.g., a mobile phone or IoT device that includes a wireless network interface device) using the radio transceiver of the edge node and a radio transceiver included in a wireless modem of the user device.

In some examples, the edge node of the network 310, 312 is a base station node. For example, the edge node can be an Evolved Node B ("eNodeB"). The edge station node can be communicatively coupled to at least one of a Radio Network Controller ("RNC"), a Mobility Management Entity ("MME") node, a gateway node (such as a serving gateway or packet data network gateway), and a home subscriber server ("HSS").

In some examples, prior to exchanging information with a user device, the edge node establishes a wireless communication session with the user device by performing a signaling process. As a result of the signaling processing, a communication session can be established between the user device and the edge node of the network 310, 312. In some examples, each session between a user device and an edge node of the network is managed by an MME of the network 310, 312.

The network analysis platform 320 can be implemented by a mobile networking service, network monitoring and/or control service, network security service, internet service provider, or any other network service. In some examples, one or more aspects of the system can be enabled by a web-based software platform operable on a web server or distributed computing system. In some examples, the platform 320 can be implemented as at least one hardware device that includes a bus that interfaces with processors, a main memory, a processor-readable storage medium, and a network interface device. The bus can also interface with at least one of a display device and a user input device.

In some examples, at least one network interface device of the platform 320 is communicatively coupled to at least one network interface device of the network 310, 312 (e.g., an MME) directly or indirectly via one of a public network (e.g., the Internet) or a private network. In some examples, at least one network interface device of the platform 320 is communicatively coupled to a network interface device of at least one operator device 360, 362.

The platform 320 can include an API system 328 that provides an API that is used by a device (e.g., operator device 360, 362, a network monitoring system of the network 310, 312, a node of the network 310, 312) to communicate with the platform 320. In some examples, the API system 328 provides a REST API. The API system 328 can include a web server that provides a web-based API. The API system 328 can be configured to process requests received from a node of the mobile network 310, 312 (e.g., a network monitoring system) to receive telemetry data from the network 310, 312. In some embodiments, the API system 328 includes a web server that provides a web-based API.

In some examples, the platform 320 includes a user interface system 324. The user interface system 324 can be an application server (e.g., web server) that is configured to provide a user interface through which an operator device 360, 362 can interact with the platform 320. The platform 320 can process requests received from an operator device 360, 362 (e.g., through the API system 328 of the platform 320 or the user interface system 324 of the platform 320) relating to telemetry data 316, 318 from the network 310, 312. For example, the operator device 360, 362 can provide the platform 320 with connection information for establishing a network connection with a node of the mobile network 310, 312, and the platform 320 can use that connection information to establish a network connection with the node of the mobile network 310, 312 and receive telemetry data 316, 318 from the network 310 via the established network connection.

As mentioned above, the platform 320 can include a data store 322. The data store 322 can be a database (e.g., a relational database, a NoSQL database, a data lake, a graph database). The data store 322 include telemetry data of the network 310. The platform 320 can access telemetry data 316, 318 from the network 310, 312 and store the accessed telemetry data 316, 318 in the data store 332. The data store 332 can include one or more databases in which telemetry data 316, 318 collected from operators of mobile networks or other various entities is stored. In one example, the data store 332 includes a mobile network databank for storing mobile network data during an analysis of problems within the network.

The platform 320 can also include a user experience modeling system 340. In some examples, the modeling system 340 generates a trained user experience model that outputs a prediction of a user experience value given an input data set that includes data for one or more features included in RAN information of the network 310, 312. The data can include, for example, RAN information stored in the data store 332 and RAN information received as telemetry data 316, 318 from the network 310, 312. In some examples, each input data set input into the trained user experience model represents a user network session. For each input data set being used to train a user-experience model, the platform 320 can access information indicating at least one of uplink throughput, downlink throughput, voice quality, call drops, and setup failures. In some examples, for each input data set being used to train a user-experience model, the platform 320 stores information indicating at least one of uplink throughput, downlink throughput, voice quality, call drops, and setup failures.

In some examples, the modeling system 340 generates the trained user experience model to predict at least one of uplink throughput, downlink throughput, voice quality, call drops, and setup failures as a target of the model. The modeling system 340 can generate the trained user experience model based on user input received from the operator device 360, 362. The user input can identify at least one of a target for the model and a feature of RAN information to be used by the model. The platform 320 can store at least one trained user-experience model, such as by storing it within the data store 332. The platform 320 can also receive or access a trained user-experience model provided by an operator device 360, 362.

The platform 320 can be a multi-tenant platform that manages platform accounts for a plurality of networks 310, 312. For example, a first platform account can be associated with a first operator device 360 and first network 310, while a second platform account can be associated with a second operator device 362 and a second mobile network 312. In some examples, the platform 320 stores a first user-experience model for the first platform account and a second user-experience model for the second platform account. The first user-experience model can be trained on RAN information received from the first network 310, while the second user-experience model can be trained on RAN information received from the second network 312. Alternatively, the user-experience models can be trained based on combined information from both the first and second networks 310, 312. In some examples, the first user-experience model has a target selected by the first operator device 360, while the second user-experience model has a target selected by the second operator device 362.

The user experience modeling system 340 can include one or more of a local machine learning system (e.g., implemented in Python, R, or another language), a cloud-based machine learning client (e.g., an application communicatively coupled to a cloud-based machine learning system such as, for example, MICROSOFT AZURE MACHINE LEARNING SERVICE). At least one machine learning system included in the system 340 can be configured to perform one or more of: supervised learning (e.g., using logistic regression, back propagation neural networks, random forests, or decision trees), unsupervised learning (e.g., using an apriori algorithm or kmeans clustering), semi-supervised learning, reinforcement learning (e.g., using a Q-learning algorithm or temporal difference learning), and any other suitable learning style.

In some examples, at least one model generated by the system 340 implements at least one of: a regression algorithm (e.g., ordinary least squares, logistic regression, stepwise regression, multivariate adaptive regression splines, or locally estimated scatterplot smoothing), an instance-based method (e.g., k-nearest neighbor, learning vector quantization, or self-organizing map), a regularization method (e.g., ridge regression, least absolute shrinkage and selection operator, or elastic net), a decision tree learning method (e.g., classification and regression tree, iterative dichotomiser 3, C4.5, chi-squared automatic interaction detection, decision stump, random forest, multivariate adaptive regression splines, or gradient boosting machines), a Bayesian method (e.g., naïve Bayes, averaged one-dependence estimators, or Bayesian belief network), a kernel method (e.g., a support vector machine, a radial basis function, or a linear discriminant analysis), a clustering method (e.g., k-means clustering or expectation maximization), an associated rule learning algorithm (e.g., an apriori algorithm or an Eclat algorithm), an artificial neural network model (e.g., a Perceptron method, a back-propagation method, a Hopfield network method, a self-organizing map method, or a learning vector quantization method), a deep learning algorithm (e.g., a restricted Boltzmann machine, a deep belief network method, a convolutional network method, or a stacked auto-encoder method), a dimensionality reduction method (e.g., principal component analysis, partial least squares regression, Sammon mapping, multidimensional scaling, or projection pursuit), an ensemble method (e.g., boosting, bootstrapped aggregation, AdaBoost, stacked generalization, gradient boosting machine method, or random forest method), and any other suitable form of machine learning algorithm. In some examples, at least one processing portion of the system 340 can additionally or alternatively leverage: a probabilistic module, heuristic module, deterministic module, or any other suitable module leveraging any other suitable computation method, machine learning method or combination thereof. Any suitable machine learning approach can otherwise be incorporated in the system 340.

The classification engine 336 can compare actual and expected outputs from models and determine whether a session is impacted. The classification engine 336 can also select the appropriate model based on the service being tested, such as downlink throughput, and the root cause of a problem being checked, such as downlink interference.

Figure 4A:
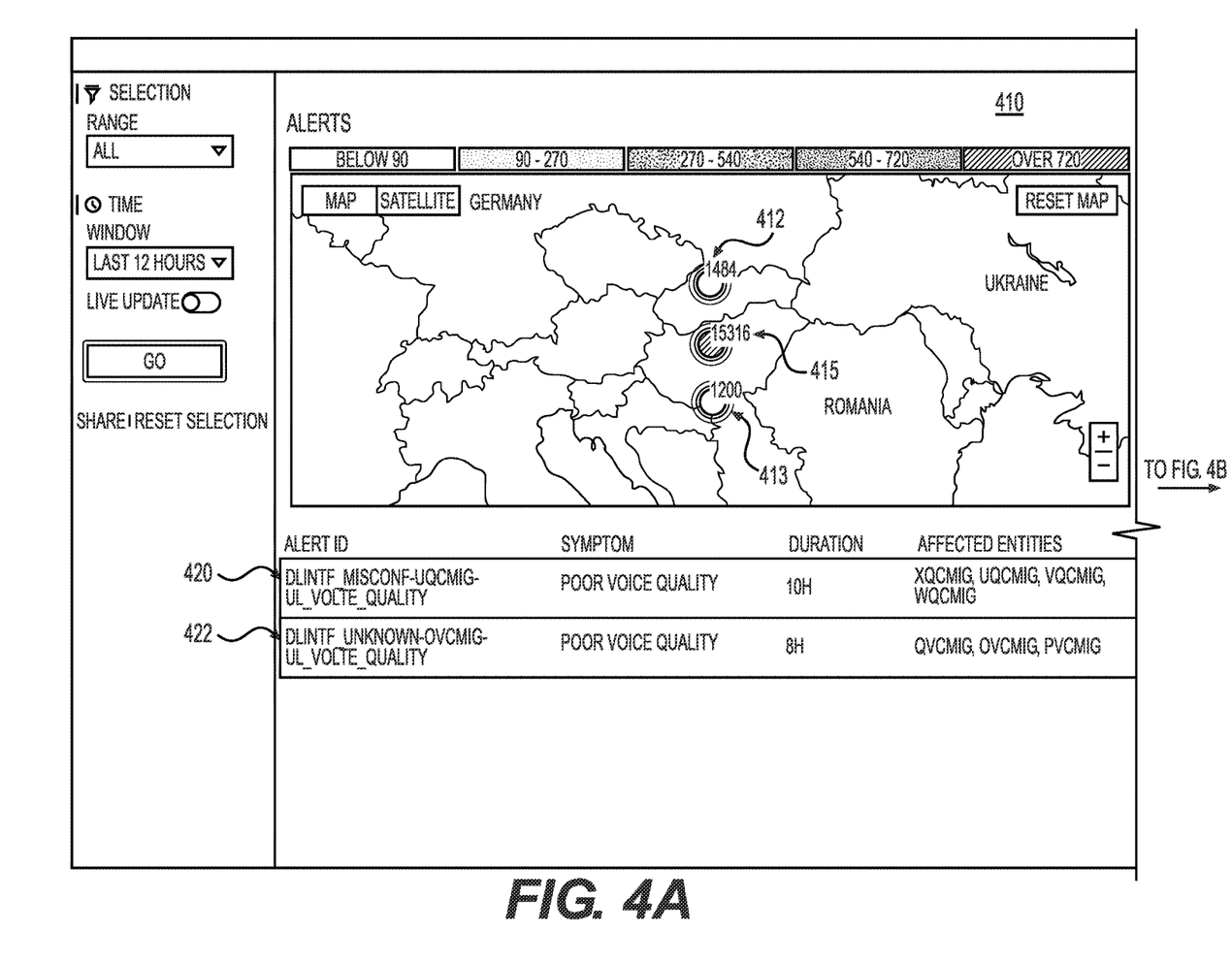
FIGS. 4A and 4B are illustrations of an example GUI screen for downlink interference detection and aggressor cell identification.
Figure 4B:
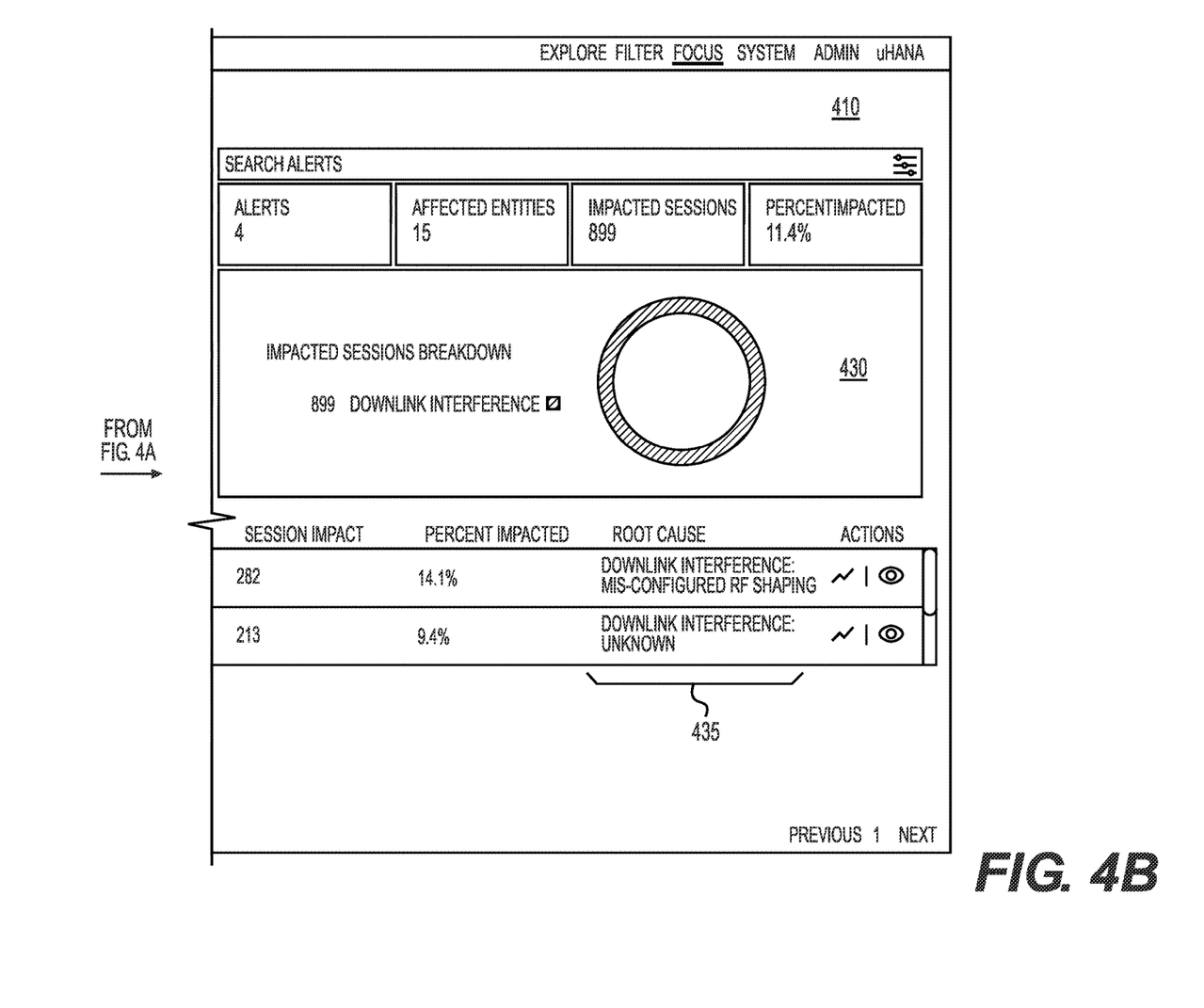

FIGS. 4A and 4B are illustrations of an example GUI screen 410 for downlink interference detection and cause identification of overshooting aggressor cells. The screen 410 spans both FIGS. 4A and 4B. Beginning with FIG. 4A, a map area on the screen 410 can show geographic locations of base stations 412, 413, 415. Additionally, numbers of impacted sessions for each base station 412, 413, 415 can be displayed on the GUI. In this example, base station 412 has 1484 impacts, base station 413 has 1200 impacts, and base station 415 has 15316 impacts. These impacts can be limited to a particular root cause, such as downlink interference, or can include impacts for multiple different performance features, such as load imbalance, coverage issues, uplink issues, and downlink issues. A threshold impact number can be 5000. Because base station 415 exceeds that threshold (having 15316 impacts), it can be highlighted differently on the GUI. This highlighting can indicate that the base station 15316 is a victim cell.

Alerts 420, 422 can be displayed on the GUI relative to one or more selected or displayed cells. In this example, the first alert 420 and second alert 422 both relate to poor voice quality. These can be based on downlink interference impacting sessions, with a threshold number of sessions being impacted for a period of time. Other alerts are also possible, such as a load imbalance based on poor downlink throughput.

More information can be provided on screen 410 as shown in FIG. 4B. In one example, a root cause 435 is shown for the alerts. For both alerts 420, 422, the root cause 435 can be downlink interference. The administrator can investigate further to determine if that is based on certain aggressor cells, and then inspect transmit levels or tilt angle at those cells.

Additionally, screen 410 can give a breakdown 430 of the impacted sessions at the cell. In this example, the sessions are all impacted based on downlink interference. This could be based on the administrator filtering out just the issues related to downlink interference. However, other issue types can be determined using different performance models and different normalized factors.

Figure 5A:
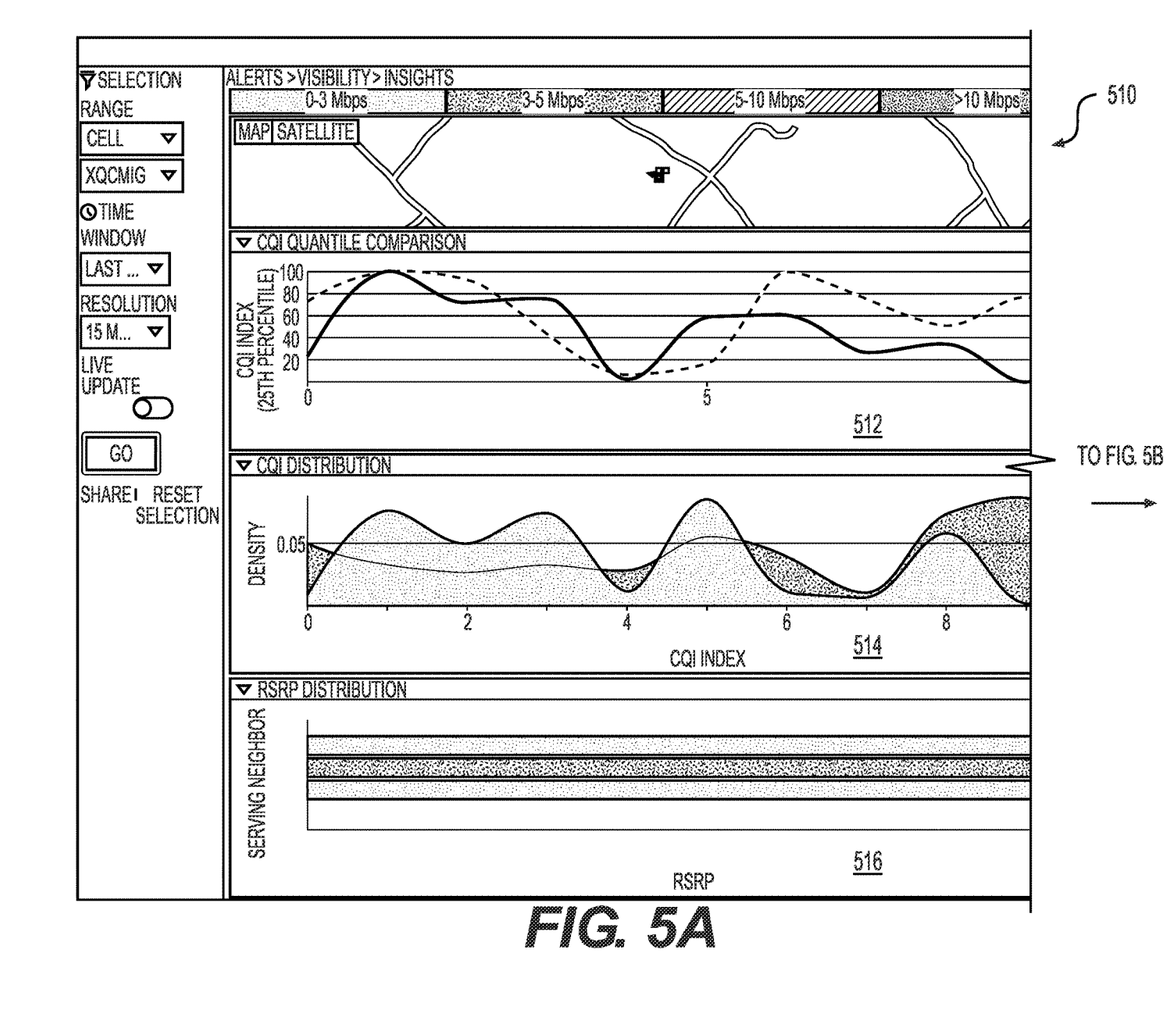
FIGS. 5A and 5B are illustrations of an example GUI screen for downlink interference detection and aggressor cell identification.
Figure 5B:
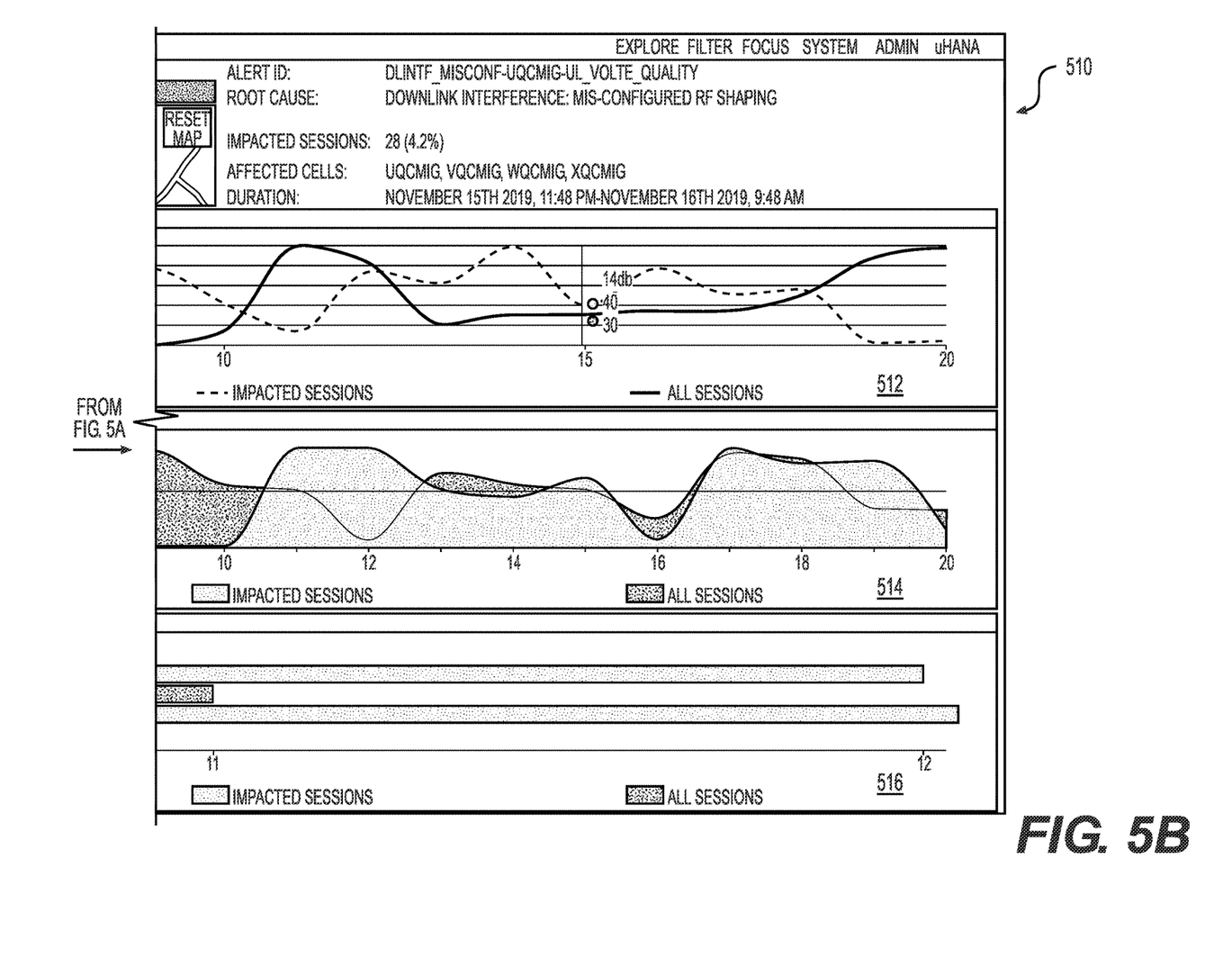

The user can select an alert in one example and see how various factors related to the alert changed during the time span over which the impacts were determined. For example, FIGS. 5A and 5B are illustrations of a second GUI screen 510 for downlink interference details. The second screen 510 can include panes 512, 514, 516 having relevant data regarding the sessions impacted by downlink interference. A first pane 512 can graph how the cell's CQI index compares to the $25^{th}$ percentile of CQI in the network for impacted sessions versus all sessions. A second pane 514 can graph how CQI density is distributed across CQI indices in relation to impacted sessions versus all sessions. A third pane 516 can chart RSRP distribution between impacted sessions and all sessions. FIG. 5B shows the second half of the second screen 510. These detail screens can allow an administrator to drill down for anomalies related to the impacts.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for detecting downlink interference in a telco network, comprising:
   receiving telemetry data;
   determining an actual performance value for a first session at a first cell of a plurality of cells in the telco network;
   using a trained performance model, predicting an expected performance value for the first session based on normalized downlink interference, wherein the normalized downlink interference is based on a path loss of the first session and at least one factor relative to the plurality of cells;

determining an impact based on the expected performance value differing from the actual performance value by at least a threshold amount; and indicating that downlink interference exists with respect to the first cell based on the impact.

2. The method of claim 1, wherein the normalized downlink interference is determined based on at least one of: an average channel quality indicator (CQI) over the network, a negative acknowledgement rate across the plurality of cells, and a ratio of Rank 2 transmissions for the network, and wherein the actual and expected performance values are for throughput.

3. The method of claim 1, further comprising identifying a second cell as responsible for the downlink interference based on over-transmission.

4. The method of claim 3, wherein identifying the second cell as responsible for the downlink interference further comprises determining that the second cell has a useless overlap fraction that exceeds an overlap threshold, wherein the useless overlap fraction is a measure of sessions in first cell receiving strong signals from both the first and second cells, and wherein the strong signals are defined by signals having a Reference Signal Receive Power (RSRP) above a power threshold.

5. The method of claim 4, identifying the second cell includes matching the second cell against an identifier in a resource control measurement report from the first cell.

6. The method of claim 4, wherein the overlap fraction is defined as the $75^{th}$ percentile of useless overlap fractions among the plurality of cells.

7. The method of claim 3, further comprising indicating that at least one of a power configuration and an electronic tilt configuration should be adjusted at the second cell.

8. A non-transitory, computer-readable medium containing instructions that, when executed by a hardware-based processor, performs stages for detecting downlink interference in a telco network, the stages comprising:

receiving telemetry data;

determining an actual performance value for a first session at a first cell of a plurality of cells in the telco network;

using a trained performance model, predicting an expected performance value for the first session based on normalized downlink interference, wherein the normalized downlink interference is based on a path loss of the first session and at least one factor relative to the plurality of cells;

determining an impact based on the expected performance value differing from the actual performance value by at least a threshold amount; and indicating that downlink interference exists with respect to the first cell based on the impact.

9. The non-transitory, computer-readable medium of claim 8, wherein the normalized downlink interference is determined based on at least one of: an average channel quality indicator (CQI) over the network, a negative acknowledgement rate across the plurality of cells, and a ratio of Rank 2 transmissions for the network, and wherein the actual and expected performance values are for throughput.

10. The non-transitory, computer-readable medium of claim 8, the stages further comprising identifying a second cell as responsible for the downlink interference based on over-transmission.

11. The non-transitory, computer-readable medium of claim 10, wherein identifying the second cell as responsible for the downlink interference further comprises determining that the second cell has a useless overlap fraction that exceeds an overlap threshold, wherein the useless overlap fraction is a measure of sessions in first cell receiving strong signals from both the first and second cells, and wherein the strong signals are defined by signals having a Reference Signal Receive Power (RSRP) above a power threshold.

12. The non-transitory, computer-readable medium of claim 11, identifying the second cell includes matching the second cell against an identifier in a resource control measurement report from the first cell.

13. The non-transitory, computer-readable medium of claim 11, wherein the overlap fraction is defined as the $75^{th}$ percentile of useless overlap fractions among the plurality of cells.

14. The non-transitory, computer-readable medium of claim 10, the stages further comprising indicating that at least one of a power configuration and an electronic tilt configuration should be adjusted at the second cell.

15. A system for detecting downlink interference in a telco network, comprising:

a memory storage including a non-transitory, computer-readable medium comprising instructions; and a computing device including a hardware-based processor that executes the instructions to carry out stages comprising:

receiving telemetry data;

determining an actual performance value for a first session at a first cell of a plurality of cells in the telco network;

using a trained performance model, predicting an expected performance value for the first session based on normalized downlink interference, wherein the normalized downlink interference is based on a path loss of the first session and at least one factor relative to the plurality of cells;

determining an impact based on the expected performance value differing from the actual performance value by at least a threshold amount; and indicating that downlink interference exists with respect to the first cell based on the impact.

16. The system of claim 15, wherein the normalized downlink interference is determined based on at least one of: an average channel quality indicator (CQI) over the network, a negative acknowledgement rate across the plurality of cells, and a ratio of Rank 2 transmissions for the network, and wherein the actual and expected performance values are for throughput.

17. The system of claim 15, the stages further comprising identifying a second cell as responsible for the downlink interference based on over-transmission.

18. The system of claim 17, wherein identifying the second cell as responsible for the downlink interference further comprises determining that the second cell has a useless overlap fraction that exceeds an overlap threshold, wherein the useless overlap fraction is a measure of sessions in first cell receiving strong signals from both the first and second cells, and wherein the strong signals are defined by signals having a Reference Signal Receive Power (RSRP) above a power threshold.

19. The system of claim 17, identifying the second cell includes matching the second cell against an identifier in a resource control measurement report from the first cell.

20. The system of claim 18, wherein the overlap fraction is defined as the $75^{th}$ percentile of useless overlap fractions among the plurality of cells.

* * * * *